Oct. 24, 1950 — V. J. HUFNAGEL — 2,527,064

FISH LURE

Filed Oct. 26, 1945

INVENTOR
VICTOR J. HUFNAGEL
BY Raymond J. McVernon
ATTORNEY

Patented Oct. 24, 1950

2,527,064

UNITED STATES PATENT OFFICE 2,527,064

FISH LURE

Victor J. Hufnagel, Detroit, Mich.

Application October 26, 1945, Serial No. 624,693

1 Claim. (Cl. 43—42.5)

This invention relates to a fish lure, and in particular it relates to a fish lure of the spoon type in which the body of the lure is so shaped that it assumes a peculiar and novel movement as it passes through a body of water.

While it is recognized that there are prior fish lures of a character of the spoon type, I have found that, by a unique proportioning and construction, a lure may be formed which, when towed through a body of water exhibits a double movement having defined limits in its cycle of operation. For example, as the fish lure is advanced along a predetermined path it also moves in an arcuate path pivotally of the axial predetermined path of movement; this arcuate movement being limited to a reciprocating path less than a complete revolution about the axis of its predetermined path of movement. In addition, the fish lure functions to move in a sinusoidal path in the general direction of the pull of the line to its general predetermined path of movement. In general, in order to accomplish this peculiar movement, my invention contemplates a spoon shaped body portion having an extension lead portion projecting therefrom in a diagonal relation and in advance of means attached to the lure for towing the lure.

Amongst the objects of my invention are to provide a fish lure capable of performing a novel double movement when towed through a body of water; to provide such a fish lure which may be readily shaped from a single sheet of metal; and, to provide a fish lure of the character described which may be manufactured economically and expeditiously. These and other objects and advantages will appear more fully in the following detailed description when considered in connection with the accompanying drawing, in which Figure 1 is a plan view of an embodiment of my invention;

Figure 1:
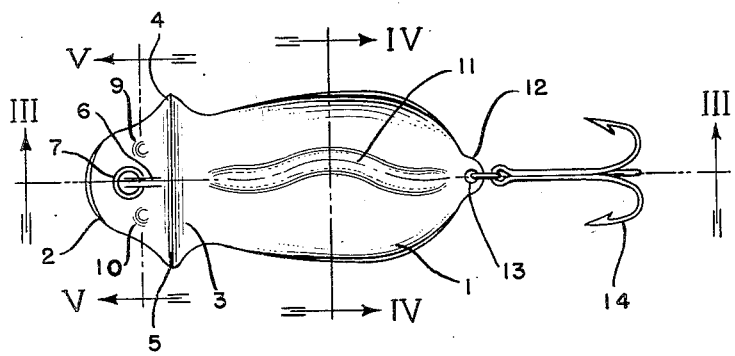
Figure 2:
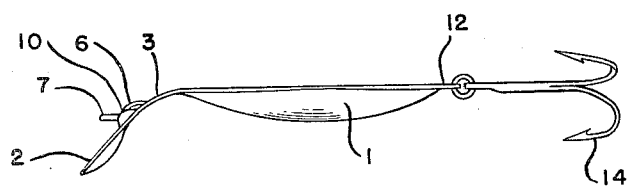
Figure 2 is a side elevational view thereof.
Figure 3:
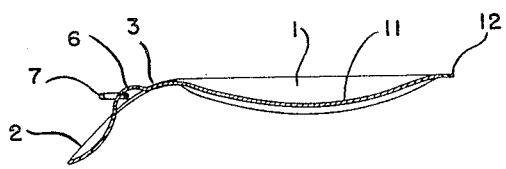
Figure 3 is a longitudinal view, in section, taken along lines III—III of Figure 1.
Figure 4:
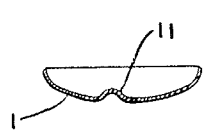
Figure 4 is a transverse view, in section, taken along lines IV—IV of Figure 1; and, Figure 5 is a transverse view, in section, taken along lines V—V of Figure 1.
Figure 5:
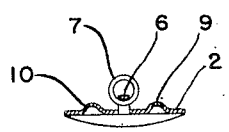

With reference to the drawing, I show an embodiment of my invention constituting a fish lure which comprises essentially a main body portion 1 and an extension portion 2. These portions are formed of a sheet material having a thickness of approximately $\frac{1}{32}$". Preferably, in material composition, the fish lure is formed of sheet metal. However, it is to be understood that it may likewise be formed of other sheet material such as compressed fibers, synthetic resins, or plastics. The metal possesses some advantage over the other suggested materials because of its weight factor.

The principal body portion 1 is proportioned somewhat in the shape of a spoon in which its transverse width is equal to approximately 5/8 of the length of the body portion 1. Also, the entire body portion is depressed or dish-shaped to the extent that the deepest portion of the dish effect provides a depth equal to approximately 1/8 of the length of the body portion. These general proportions are essential in order to obtain optimum functional performance of the fish lure. The leading part 3 of the body portion 1 is not dish-shaped but a cylindrical surface in part whose axis of curvature extends transversely of the length of the body and said cylindrical surface includes a portion tangent to the lead portion 2. Adjacent to the intermediate part 3 are ears 4 and 5 which extend transversely outward from the part 3. Centrally disposed and positioned intermediate the part 3 and the extension portion 2 is a short ribbon 6 separated in part from the material composition of the lure and pressed outwardly to form an opening to receive an eye 7 which serves as a means to attach a line for towing purposes.

The lead portion 2 is also dish-shaped in the same general direction as the body portion 1. The dish-portion, however, is shallower, and the entire lead portion has a length which is equal to about one-half of the length of the body portion 1. Also, the lead portion 2 is disposed at an angle or diagonal relation relative to the body portion 1. The general path of movement of the fish lure is along a direction substantially parallel to the longitudinal axis of the body portion 1. The lead portion, therefore, is positioned at an angle of between 30 and 45 degrees relative to a plane as determined by the rim of the body portion 1.

For purpose of ornamentation and reinforcement, a pair of eyes 9 and 10 constituting raised portions in the sheet-material may be located on the lead portion on either side of the separated ribbon 6. Also, a sinusoidal raised portion 11 is formed along the bottom of the body portion 1. At the trailing end of the lure is a projection 12 provided with an aperture 13 for the reception of a conventional fish hook 14. The entire fish lure may be polished or painted to add to its attractive appearance as desired.

In the operation of the fish lure, a fish line is connected to the eye 7 and the lure is towed through a body of water. Because of the peculiar shape of the lure, the towing causes the lure to assume a reciprocal arcuate movement about the axis of a line representing the direction in which the lure is towed. This reciprocal movement is such that the lure, when viewed axially of its towed path, rotates from its normal horizontal position to a position of about 30 degrees above the horizontal. Immediately thereafter the lure reciprocates in the opposite direction to a position of about 30 degrees below the horizontal. This movement continues all during the time the lure is being towed, and at no time does the lure rotate completely about its towing path. Simultaneously, with the movement above described, the lure also moves from side to side, constituting a sinusoidal path following the general direction over which the lure is being towed.

As thus described, it is believed apparent that I have provided a fish lure of peculiar design and shape which, when towed through a body of water, provides a unique pattern of movement, and while I have described a preferred embodiment of my invention it is to be understood that I contemplate those modifications which appear obviously within the spirit of my invention and as appearing in the scope of the appended claim.

Having thus described my invention what I claim and desire to protect by Letters Patent is:

A fish lure comprising a body portion and a connecting lead portion, said body portion being formed of sheet material substantially oval in shape and being dish-shaped throughout its principal area, said lead portion having its principal plane extending at an angle of between 30 and 45 degrees relative to the principal plane of the body portion and being dish-shaped in a direction so that the resulting convex part of the dish-shaped portion extends from the same continuing surface as the convex part of the dish-shaped body portion, an intermediate portion forming the connection between the lead portion and the body portion, said intermediate portion forming in part a cylindrical surface extending completely across the intermediate portion, the axis of curvature of said cylindrical surface extending transversely of the length of the body and said cylindrical surface including a portion tangent to the lead portion, said intermediate portion being wider than either the body or lead portions, and a fastening means comprising a slit raised portion forming a loop projecting from said intermediate portion and forming means whereby a line may be attached thereto.

VICTOR J. HUFNAGEL.

REFERENCES CITED

The following references are of record in the file of this patent:

UNITED STATES PATENTS

| Number | Name | Date |
|---|---|---|
| 1,334,249 | Lane | Mar. 16, 1920 |
| 1,352,054 | Dills | Sept. 7, 1920 |
| 1,861,110 | Campbell | May 31, 1932 |
| 2,088,775 | Davenport | Aug. 3, 1937 |
| 2,197,209 | Eppinger | Apr. 16, 1940 |
| 2,251,593 | Mangle | Aug. 5, 1941 |
| 2,375,290 | Docteur | May 8, 1945 |